United States Patent [19]

Molligan

[11] Patent Number: 5,184,640
[45] Date of Patent: Feb. 9, 1993

[54] BACK WATER TRAP

[75] Inventor: Harry J. Molligan, New Orleans, La.

[73] Assignee: Lois L. Molligan, New Orleans, La.

[21] Appl. No.: 812,003

[22] Filed: Dec. 23, 1991

Related U.S. Application Data

[62] Division of Ser. No. 608,341, Nov. 2, 1990.

[51] Int. Cl.⁵ .............................................. F16K 13/10
[52] U.S. Cl. .................... 137/247.25; 4/300; 4/DIG. 15
[58] Field of Search ........................ 137/247.25, 114; 4/DIG. 15, 300, 437

[56] References Cited

U.S. PATENT DOCUMENTS

| | | | |
|---|---|---|---|
| 266,485 | 10/1882 | Lightbody | 137/247.25 X |
| 303,822 | 8/1884 | D'Heureuse | 137/247.25 X |
| 633,232 | 9/1889 | Davies | 137/247.25 X |
| 2,482,359 | 9/1949 | Molloy | 137/247.25 X |
| 3,871,398 | 3/1975 | Finger | 137/247.25 X |
| 4,203,173 | 5/1980 | Morris et al. | 4/DIG. 15 X |
| 4,498,203 | 2/1985 | Barnum et al. | 4/DIG. 15 X |
| 4,538,307 | 9/1985 | Barnum et al. | 4/DIG. 15 X |
| 4,578,831 | 4/1986 | Mellinger et al. | 4/DIG. 15 X |

*Primary Examiner*—John Rivell
*Attorney, Agent, or Firm*—Thomas S. Keaty

[57] ABSTRACT

The invention relates to a device for preventing communication through pipe lines of high security institutions. A flapper valve is provided with a valve seat having a plurality of teeth extending into the center of the opening formed in the valve seat. A pivotal flapper opens or closes the valve by abutting a seating face of the valve seat or moving away, under the force of a fluid flow, and allowing passage of waste water from a plumbing fixture to the main waste conduit. A water trap seal is optionally and/or separately mounted for delivering an additional amount of water into the conventional waste trap to fill in the waste trap with fluid and prevent undesirable communication. An independent conduit connected to a water supply deilvers water to a reservoir which is fluidly connected with a conventional jet conduit of a waster system upstream from an outlet point of the jet conduit into the main waste trap.

5 Claims, 2 Drawing Sheets

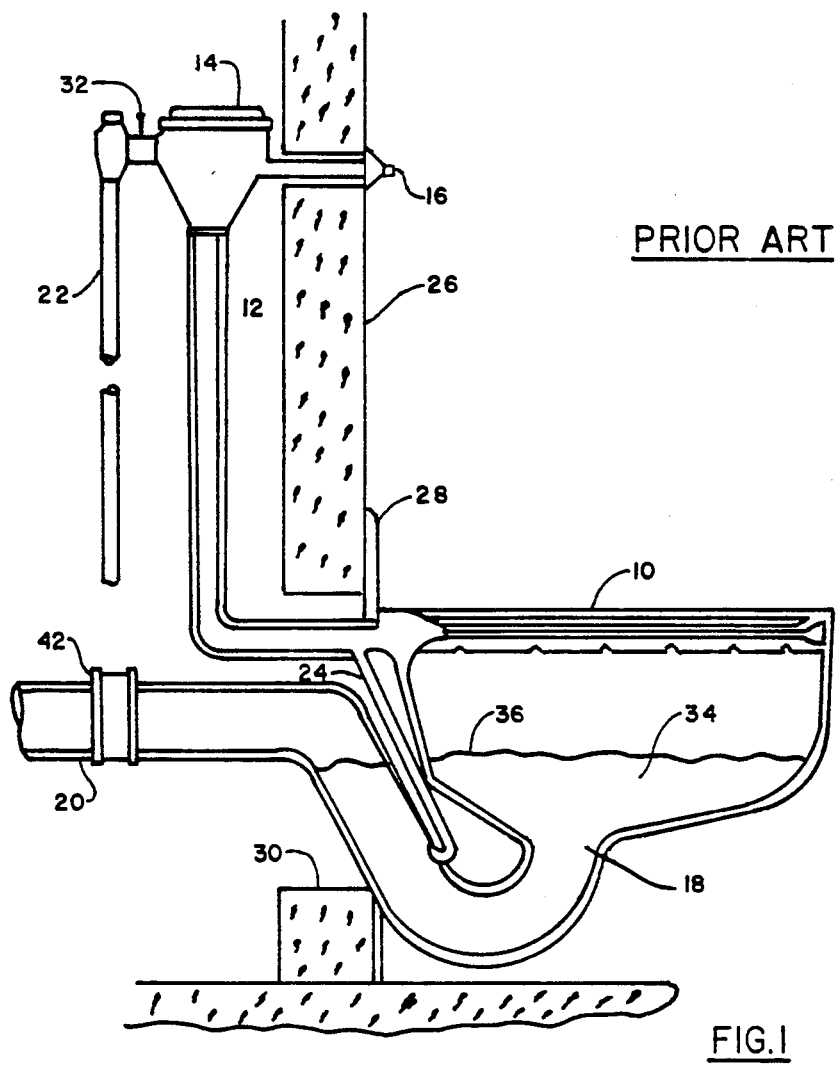
PRIOR ART
FIG. 1
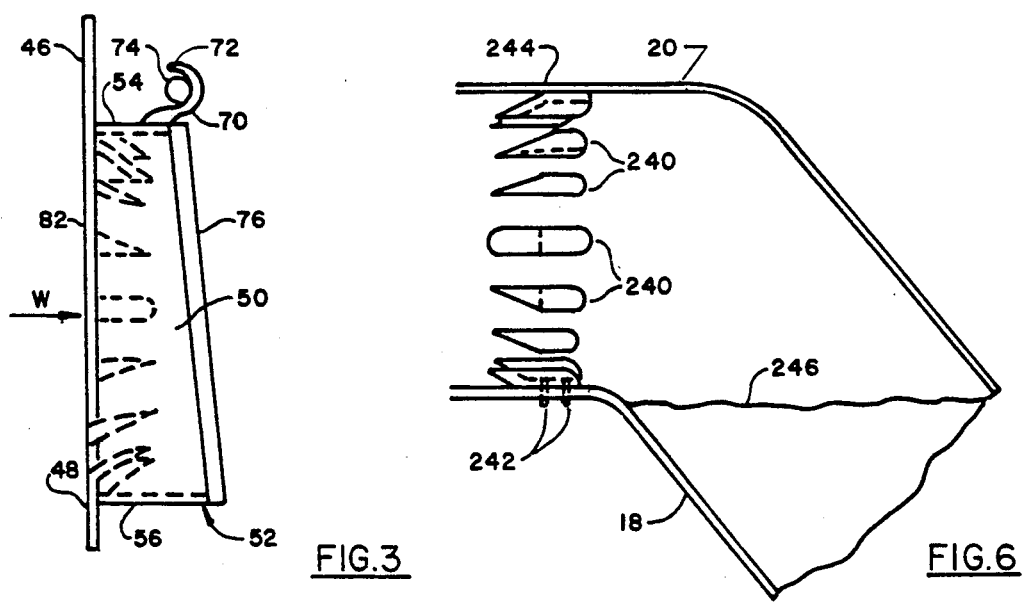
FIG. 3
FIG. 6

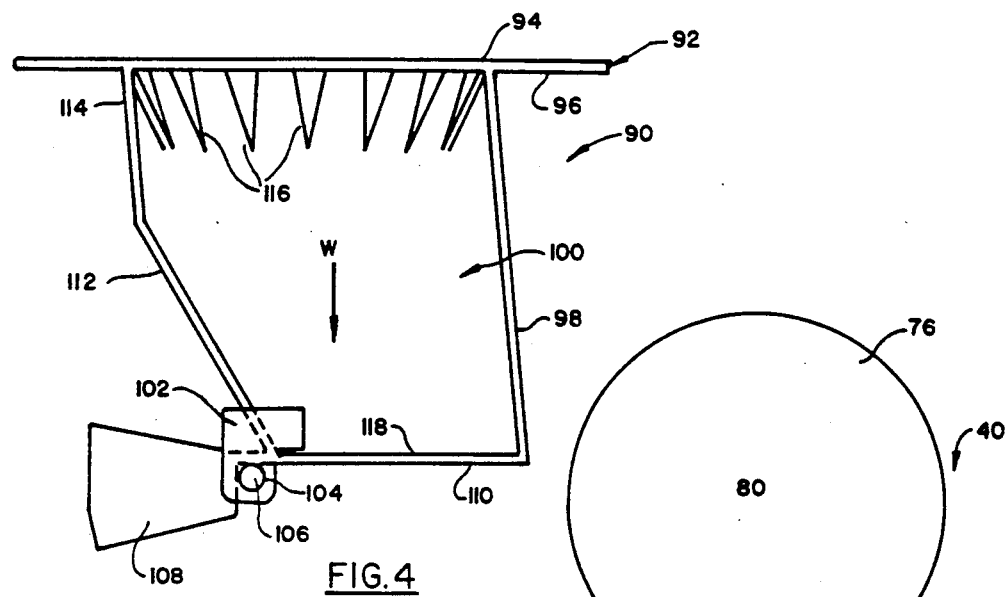
FIG. 4
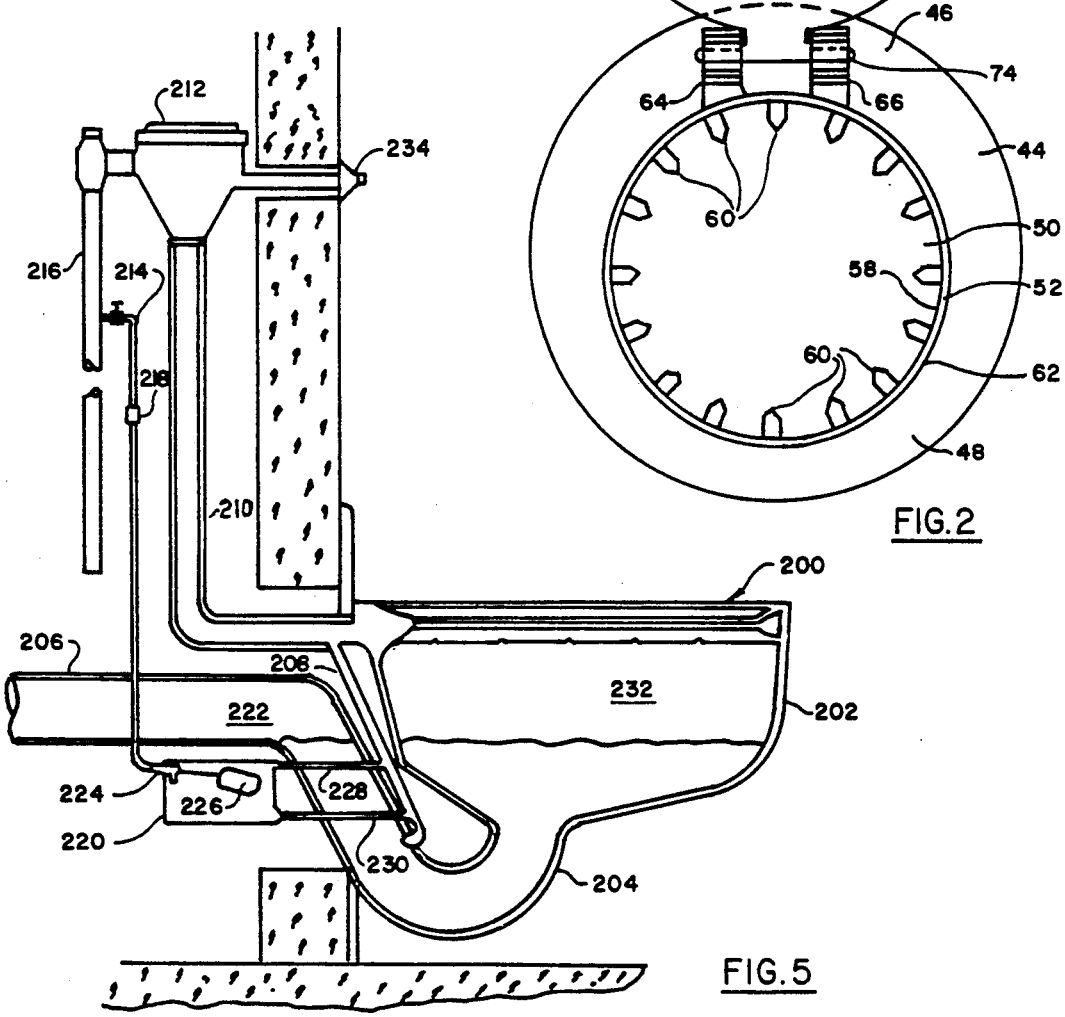
FIG. 2
FIG. 5

BACK WATER TRAP

This is a division of application Ser. No. 608,341, filed Nov. 2, 1990.

BACKGROUND OF THE INVENTION

The invention relates to water closet construction for use in high security institutions, such as prisons. More particularly, this invention relates to a means for preventing complete removal of water from the water closet in a high security type environments.

It has been a recurring problem in prisons and similar institutions that communication is established through the plumbing fixtures between prison cells since the plumbing fixtures, such as water closet drainage lines, once devoid of water, can serve as a means for direct vocal communication between adjoining cells or even for hiding of forbidden material.

It is conventional to install water closet unit in a prison cell in such a manner that only the toilet bowl and part of the drainage pipe faces the interior of the cell. The remainder of the plumbing fixtures, that is the water pipes and common headers, as well as the water tanks are positioned within a narrow space formed between the walls, on the exterior of the prison cell.

The present invention contemplates provision of a means to prevent vocal communication through the empty water pipes, as well as a possibility of hiding the forbidden material.

SUMMARY OF THE INVENTION

The present invention contemplates elimination of drawbacks associated with prior art plumbing fixture constructions and provision of a flapper valve which prevents vocal communication through the conventional pipe lines, as well as the retrieval of hidden foreign material in the pipe lines.

The flapper valve in accordance with the present invention, in one of its embodiments, comprises a circular flange adapted for an installation within a horizontally oriented pipe line. The flange is transversely mounted within the horizontal pipe line, so as to close or open the fluid communication between the waste trap of a conventional toilet bowl fixture and a common header. The valve is positioned within a conventional coupling utilized to connect two sections of pipe on the exterior of a prison cell. The valve is formed with a generally cylindrical valve seat which extends from a downstream surface of the flange in surrounding relationship to an opening formed within the flange. In one of the embodiments the opening has a center which is offset from the center of the flange. A plurality of teeth are fixedly attached to the interior wall of the valve seat and extend inwardly towards the center of the opening. A pivotal flapper is connected to the pivot pin retaining members and moves between a first position closing the valve by abutting a seating face of the valve seat and a second, open position, wherein the flapper plate is forced to move away from the seating face and allow the fluid to move from the waste trap towards the common waste header. The seating face of the valve, in one of the embodiments, is formed with a slope, so as to facilitate almost immediate closing of the flapper, under gravity, after the predetermined amount of water is moved through the waste line.

A second embodiment of the invention contemplates provision of a valve suitable for vertical-type installations, wherein the pivotal pin of the flapper is provided with a counter weight assisting in retaining the flapper in a normally closed position abutting the seating face of the valve seat. The side of the valve seat adjacent to location of the pivot pin and the counter weight is angularly formed, so as to accommodate upward and downward movement of the counter weight when the flapper is forced to open or close the valve.

Still further embodiment provides for the use of a water seal trap which is designed to be installed on the exterior of a cell. The trap device comprises an independent water line connected to the water source upstream from a conventional reservoir which supplies water to the toilet bowl fixture and the waste trap. The trap device further comprises an independent water reservoir provided with a float valve and a float to regulate a level of liquid within a jet conduit of a conventional plumbing waste system. At least one fluid line communicates with the jet conduit, delivering water from the trap reservoir towards the jet conduit upstream from the outlet connection of the jet conduit and the primary waste conduit.

It is, therefore, an object of the present invention to provide a means for preventing communication through conventional pipe lines in high security environments.

It is a further object of the invention to provide an easy-to-install and easy-to-operate device for mounting on an exterior of an enclosure, wherein the main plumbing fixture is located.

It is still a further object of the present invention to provide a means for preventing communication through the conventional pipe lines by easy and inexpensive retrofitting of the existing fixtures.

These and other objects of the present invention will be more apparent to those skilled in the art from the following description of the invention.

BRIEF DESCRIPTION OF THE DRAWINGS

Reference will now be made to the drawings, wherein like parts are designated by like numerals, and wherein FIG. 1 is a schematic view illustrating a water closet system of a typical security-type environment.

FIG. 2 is a back view of a first embodiment of the flapper valve in accordance with the present invention in a fully open position.

FIG. 3 is a side view of the valve illustrated in FIG. 2 in a closed position.

FIG. 4 is a side view of a valve in accordance with the second embodiment of the present invention in its closed position.

FIG. 5 is a schematic view illustrating a water seal trap for use in high security type environments; and FIG. 6 is a schematic view illustrating a section of a pipe with teeth.

DETAILED DESCRIPTION OF THE PREFERRED EMBODIMENT

Referring now to the drawings in more detail, numeral 10 designates a water closet unit of standard design. The unit is of an off-floor type and comprises an inlet pipe 12 which is adapted to supply water from a water reservoir, or tank 14 to the toilet bowl fixture 10 in response to an activation of a flush button 16. A waste pipe or trap 18 is integrally formed with a bottom of the toilet bowl fixture 10 and allows the waste water to be removed to a waste conduit 20 which, although not shown, is connected to a common header, each communicating with a number of such water closet fixtures.

The water is supplied to the reservoir 14 through a conventional water supply pipe 22, which receives the water supply from municipal facilities.

The water closet fixture also comprises a secondary water jet 24 which assists in propulsion of waste water from the waste trap 18 to the waste conduit 20. The jet pipe 24 is fluidly connected to the inlet water pipe 12 upstream from the toilet bowl fixture 10.

In a typical security type installation the bowl 10 and part of the trap 18, along with the associated jet pipe 24 are the only watercontaining fixtures that are located on the interior of a prison cell. A wall 26 supports the toilet bowl fixture through the attachment plate 28 and the support portion 30, allowing such off-the-floor installation in a high security environment. The remainder of the pipes are located on the outside of the cell between the adjacent parallel walls 26 in a narrow space 32 which is accessible only to service personnel.

If the water 34 which normally present in the bowl 10 at a level 36 is removed from the bowl 10 and the trap 18, the pipes 18 and 20 become conduits for audio waves and create a security problem. In order to prevent such communication, the present invention contemplates provision of a flapper valve 40 in the waste pipe 20 within the space 32. The valve 40 is preferably installed inside a pipe coupling 42 which secures two sections of the waste pipe 20. The coupling 42 is a conventional coupling and comprises a resilient ring having a number of annular grooves formed on the interior thereof for receiving sealing means and ensuring leak-proof connection between two sections of the pipe.

Turning now to FIG. 2, the flapper valve 40 in accordance with the first embodiment of the present invention is illustrated in a fully open position, for clarity. The valve 40 comprises an annular flange 44, the outer diameter of which is substantially equal to or slightly smaller to the interior diameter of the coupling 42. The flange 40 is formed with a circular opening which is offset from the center of the flange 44. As a result, an upper portion 46 of the flange 44 is wider than the lower portion 48 thereof.

Extending perpendicularly to the flange 44 and encircling the opening 50, which is formed in the flange 44, is a cylindrically-shaped valve seat 52 having an upper wall 54 and a lower wall 56. The cylindrical valve seat 52 is attached to the flange 44 in transverse relationship and forms a flow conduit by its interior wall 58.

Extending inwardly from the interior wall 58 are a plurality of sharpened teeth 60 which are fixedly attached to, such as by welding or integral formed with the wall 58 and are designed to prevent retrieval of foreign material from the pipe 20.

As can be seen in FIG. 3, the cylindrical valve seat 52 is formed with a sloping top edge, such that the upper part of the wall 54 is smaller than the lower part 56.

Fixedly attached to the exterior wall 62 of the valve seat 52 is a pair of engaging hooks 64 and 66, each extending outwardly from the wall 62 and having a curved hook-like portion 70. An arched space 72 is formed by the hooks 70 to receive opposite ends of a flapper pivot pin 74 therein. The flapper pin 74 is integrally formed with a flapper plate 76 which has a diameter at least as great as the diameter of the interior wall 58 of the valve seat 52. Still, in the preferred embodiment the diameter of the flapper plate 76 is equal to the diameter to the exterior wall 62 of the valve seat 52. The flapper 76 is a substantially flat plate of circular configuration and, when in a closed position, covers and closes the opening 50 which serves as a passageway for the water by abutting the top edge, i.e. a seating face of the valve seat 52.

When the water flows in the direction of arrow W, it forces the flapper plate 76 to pivot about the axis formed by the flapper pin 74 and move away from its sitting position against the seating face of the valve seat 52. When the water flow no longer acts on the interior surface 80 of the flapper plate 76, the flapper moves down, under gravity, closing the opening 50 and preventing communication between the adjoining sections of the pipe 20. The difference in the length of the wall portions 54 and 56 of the valve seat 52 assists in returning the flapper plate 76 into its closed position.

If desired, the valve 40 can be formed without the teeth 60. Optionally, the valve 40 can be also provided with an outwardly flared extension for better flow characteristics within the coupling 42. The extension would be fixedly attached on the upstream side, or surface 82 of the flange 44 and extend in a substantially perpendicular relationship to the flange 46, similar to the valve seat 52. It was determined that the extension having a flaring-out exterior annular portion would improve flow characteristics in the desired manner.

Turning now to the embodiment in FIG. 4, a flapper valve of the second embodiment in accordance with the present invention is in its closed position. The second embodiment is better adapted to a vertical-type installation, as opposed to a horizontal type installation, for which the valve 40 is adapted. As can be seen in the drawing, the valve of the second embodiment is generally designated by numeral 90. The valve 90 is designed for vertical-type installations, wherein the waste trap conduit 18 of the toilet fixture is oriented vertically and passes through an opening formed in the floor of the cell to further communicate with adjoining pipelines in a conventional manner.

The valve 90 comprises an annular flange 92 having an exterior, upflow side 94 and an interior, downflow side 96. The diameter of the flange 92 is sized and shaped to fit within the coupling 42 which would conventionally connect two sections of the pipe 20 but oriented vertically (as opposed to a horizontal-type installation illustrated in FIG. 1).

Fixedly attached to the downflow side 96 of the flange 92 is a generally cylindrical valve seat 98 which defines a fluid flow passageway 100 therein.

Fixedly attached to the upflow portion of the valve seat 98 are pivot pin engaging brackets 102 which are formed with a pair of openings 104 (only one bracket 102 is shown in FIG. 4) and is adapted to receive a pivot shaft or pin 106 therethrough. The opposite end of the pin 106 is engaged in a second diametrically opposite bracket 102.

The pin 106 carries a counterweight 108 which is fixedly engaged with the pin 106 and with the flapper plate 110. The plate 110 is integrally formed or otherwise affixed to the pin 106 and pivots between an open position, allowing fluid communication between the trap 18 and the waste pipe 20 through the passageway 100, and a closed position, preventing such communication. The valve 90 is illustrated in FIG. 4 in a fully closed position.

As will be appreciated, when the flapper 110 moves outwardly, opening the flow passageway and allowing the waste water to flow in the direction of the arrow W, the counterweight 108 moves upwardly towards the valve seat side 112 by pivoting about a axis formed by the pin 106. In order to accommodate the pivoting movement of the counterweight 108, the side 112 of the valve seat 98 is slanted, as illustrated in FIG. 4, so as to permit the flapper 110 to move into a fully opened position in general co-axial alignment with the axis of the passageway 100.

Extending inwardly from the upstream part 114 of the valve seat 98 are a plurality of sharp teeth 116 which extend downwardly into the passageway 100 and inwardly towards the central axis of the passageway. The teeth 116, similar to the teeth 60 of the embodiment in FIG. 2, prevent retrieval of a foreign object through the piping system of the water closet fixture. The flange 92 is frictionally engaged within a flexible resilient coupling in a conventional manner and is positioned therein on the exterior of the cell, thus making it inaccessible and tamperproof.

The valves 40 and 90 can be made from non-corrosive metal, such as brass, copper and the like, which are conventionally used for plumbing elements. The teeth 60 and 116 of the valves 40 and 90, respectively, are formed either integrally or affixed by welding to the interior walls of the valve seats 52 and 98. The counterweight 108 can be made from high density metal, such as lead or an alloy, to enable the flapper plate 110 to return to its closed position immediately after the force of the water on the interior side 118 of the flapper plate 110 is no longer acting.

Turning now to FIG. 5 of the drawings, a water seal trap is disclosed in use with a standard off the floor water closet fixture 200. Similar to the embodiment of FIG. 1, the fixture 200 comprises a water bowl 202 having a waste trap conduit 204 connecting the bowl 202 with a waste water pipe 206. A jet 208, on its inlet end, is in fluid communication with a water inlet pipe 210 which connects the toilet bowl 202 with a water reservoir 212. On the outlet end of the jet 208 communicates with the waste trap 204. The jet pipe 208 is located upstream from the toilet bowl 202, as shown in the drawings.

The present invention contemplates provision of a secondary water inlet line 214 which is fluidly connected to a water supply line 216 upstream from the water reservoir 212. The secondary water inlet line 214 is provided with a back flow valve 218 to prevent back flow of the water into the pipe 214. The lower end of the secondary inlet pipe 214 is received within a closed container 220 which is positioned below the outlet end 222 of the waste trap 204.

The container 220 houses a float valve 224 and a float 226, which is designed to open the valve 224 when the water inside the jet tube 208 reaches a pre-determined level. The container 220 is fluidly connected to the jet tube 208 by an upper refill tube 228 and a lower refill tube 230.

As will be appreciated, the lowermost, outlet end of the jet tube 208 directly communicates with the waste trap 204 and thus is fluidly connected to a chamber 232 formed by the toilet bowl fixture 202. When the water is flushed by activating the flush button 234, the water supply is delivered through the inlet pipe 210 from the reservoir 212 into the chamber 232 and, almost simultaneously into the jet tube 208.

When the water level in the trap 204 decreases, the float 226 changes its position, opening the float valve 224 and allowing the water to enter through the back flow valve 218 into the reservoir 220 and subsequently into the jet tube 208. In this manner, additional water is admitted into the trap 204 through a pipeline which is not immediately controlled by the main water flushing system which contains the reservoir 212, inlet pipe 210, jet tube 208 and the waste trap 204.

The container 220 allows admission of a sufficient amount of water to at least partially fill the trap 204 to a level not accessible from the inside of a prison cell, thus preventing complete removal of liquid from the water closet system.

The present invention also allows to prevent a backflow of sewerage fluids when wall mounted toilets are installed in back-to-back manner in the so-called cross or double combination of Y and eight bend. The valve of the present invention advantageously prevents backflow of sewerage fluid if there is a stoppage downstream in the waste piping.

As an alternative to installation of valves 40 and 90, the present invention contemplates provision of a plurality of teeth fixedly attached to an interior wall of the waste pipe 20 or 206. As illustrated in FIG. 6, the waste pipe 20 is provided with a plurality of spaced-apart teeth 240 which are bolted, such as by bolts 242 to an interior wall 244 of the pipe 20. The teeth 240 can be welded to the wall 244, if so desired. It is preferred that the section of pipe having teeth extending inwardly from the interior wall 244 towards a center of the pipe 20 be mounted downstream from the waste trap 18 at the location free from water 246.

It is also preferred that the teeth 240 be attached substantially about entire circumference of the interior wall 244.

Many changes and modifications can be made within the design of the present invention without departing from the spirit thereof. I, therefore, pray that my rights to the present invention be limited only by the scope of the appended claims.

I claim:

1. A water seal device for use with a sewer pipe system having a primary waste conduit and a secondary jet conduit in fluid communication with the primary waste conduit, both primary and secondary conduits being connected to a water source means, said device comprising:

an independent water conduit connected to said water source means upstream from said primary and secondary conduits;

a reservoir for retaining a discreet amount of water delivered by said independent conduit; and a fluid line means connecting said reservoir with said secondary jet conduit upstream from an outlet point of said secondary conduit into the primary waste conduit.

2. The device of claim 1, wherein said water reservoir comprises a float valve means and float means for regulating a level of water within said secondary conduit.

3. The device of claim 1, wherein said float valve allows fluid communication between said independent water conduit and said secondary conduit in response to removal of water from said secondary conduit.

4. The device of claim 1, wherein said fluid line means comprises a pair of fluid lines connecting said reservoir with said secondary jet conduit, said fluid lines extending in a spaced-apart vertically parallel relationship to each other.

5. The device of claim 1, further comprising a check valve means mounted in said independent water conduit upstream from said water reservoir.

* * * * *